United States Patent
Swan et al.

(10) Patent No.: US 7,663,878 B2
(45) Date of Patent: Feb. 16, 2010

(54) MODULAR PROTECTIVE HOUSING WITH PERIPHERALS FOR A HANDHELD COMMUNICATIONS DEVICE

(76) Inventors: Harris Kent Swan, 1104 SW. 13 Pl., Boca Raton, FL (US) 33486; Kirk Little, 9250 SW. 49 St., Cooper City, FL (US) 33328

( * ) Notice: Subject to any disclaimer, the term of this patent is extended or adjusted under 35 U.S.C. 154(b) by 471 days.

(21) Appl. No.: 11/388,589

(22) Filed: Mar. 23, 2006

(65) Prior Publication Data

US 2007/0223182 A1 Sep. 27, 2007

(51) Int. Cl.
*H05K 7/12* (2006.01)
(52) U.S. Cl. ............... 361/679.56; 361/679.3; 455/575.1
(58) Field of Classification Search ........ 361/679, 361/679.56, 679.3; 455/575.1
See application file for complete search history.

(56) References Cited

U.S. PATENT DOCUMENTS

| | | | | |
|---|---|---|---|---|
| 5,522,089 A | * | 5/1996 | Kikinis et al. | 710/73 |
| 5,859,628 A | * | 1/1999 | Ross et al. | 345/173 |
| 6,003,775 A | * | 12/1999 | Ackley | 235/472.01 |
| 6,049,813 A | * | 4/2000 | Danielson et al. | 708/100 |
| 7,092,009 B2 | * | 8/2006 | Patel et al. | 348/207.1 |

* cited by examiner

*Primary Examiner*—Jayprakash N Gandhi
*Assistant Examiner*—Ingrid Wright
(74) *Attorney, Agent, or Firm*—Loeb & Loeb LLP

(57) ABSTRACT

A peripherals device for coupling with a handheld communication device includes an interface to the handheld communication device and a processor for performing functions complementary to the communications device. According to another embodiment, the peripherals device includes a conformal cavity for receiving a handheld communications device in a secure fashion. According to yet another embodiment, the peripherals device includes a data collection device for collecting data and using the interface for sending the collected data to a remote processor for further processing. The data collection device can include an image reader, a barcode reader, a signature capture device, an optical character recognition. In yet another embodiment, there is a power subsystem that powers the peripherals device and the handheld communications device. The power system has a low power state to conserve energy. In another embodiment, the peripherals device comprises a plurality of processors that automatically reconfigure themselves to work with the communication device to which the peripherals device is connected.

3 Claims, 24 Drawing Sheets

MODULAR PROTECTIVE HOUSING WITH PERIPHERALS FOR A HANDHELD COMMUNICATIONS DEVICE

CROSS-REFERENCE TO RELATED APPLICATIONS

Not Applicable.

STATEMENT REGARDING FEDERALLY SPONSORED-RESEARCH OR DEVELOPMENT

Not Applicable.

INCORPORATION BY REFERENCE OF MATERIAL SUBMITTED ON A COMPACT DISC

Not Applicable.

FIELD OF THE INVENTION

The present invention relates to portable communication devices and more specifically to a protective housing containing peripherals for personal communication devices.

BACKGROUND OF THE INVENTION

The advent of portable data communications devices that connect a user to a network has resulted in a highly mobile workplace. Mobile phones and other wireless communication devices provide their users with access to networks such as the public switched telephone network and the Internet (e.g. using the wireless application protocol (WAP)). These handheld communications devices facilitate both voice and electronic mail communications for their users and can be used in or out of the office, making them virtually indispensable to a wide range of users. Businessmen who travel frequently have come to rely on their portable communications devices or other personal digital assistants (PDAs) to keep them in touch with their clients and employees. In just about every profession there is a need for a mechanism that provides quick access to phone service, e-mails and the web and the ubiquitous PDAs have addressed this need.

Real-time communications between remote workers and headquarters is a necessity in today's fast-paced environment. In the areas of law enforcement and medicine instant communication becomes critical. Though today's popular communication PDAs, (often called smart phones) such as Research in Motion's BlackBerry™ and others do address the need for telephonic, internet (web, email, etc) and data communication, they fall short when there is a need for collecting and disseminating data such as bar codes, fingerprints, etc. That need has been addressed by specialty data collection devices as well as augmented portable personal computers such as laptops and notebooks, but these devices can be too large and heavy for on-site use.

Moreover, on-site, or in-the-field, data gathering may occur in environments that are unsuitable for most computer systems. Dirt, dust, liquid spills, moisture, excessive heat, and mechanical impacts such as caused by dropping can damage the sensitive components of most computers. Once again, the makers of specialty devices and portable computers such as notebook computers have addressed this need by "ruggedizing" their notebook systems. According to James A. Martin of PCWorld, "A portable computer especially designed for use in or on a vehicle, in the field, in a factory or warehouse, outdoors, or even in armed conflict, is said to be ruggedized or semi-ruggedized." The drawback to these ruggedized notebook computers is that they generally cost and weigh more than their less rugged counterparts. In addition, the size and weight of the notebooks becomes a problem when they are used in the field and must be carried and transported by the user for extended periods of time. The drawback for specialty data collection devices is a limited number of modes in which they can be integrated into the mobile data environment. For example, many law enforcement agencies use ruggedized notebooks. Law enforcement officers place them in their cars in a special cradle so that they can be used in situ or removed from the cradle and carried with the officer. Again, weight is a hindrance here. The Royal Canadian Mounted Police officers carry with them computers weighing between four and five pounds.

There is a need for a device which combines the lightweight portability of a mobile communicating style PDA with the data gathering ability of a specialty device, and the ruggedness and computing power of a ruggedized notebook system.

SUMMARY

Briefly according to one embodiment of the invention, a peripherals device for coupling with a handheld communication device comprises an interface to the handheld communication device and a processor for performing functions complementary to the communications device. According to another embodiment, the peripherals device comprises a conformal cavity for receiving a handheld communications device in a secure and protected fashion. According to yet another embodiment, the peripherals device comprises a data collection device for collecting data and using the interface for sending the collected data to a remote processor for further processing. The data collection device can comprise an image reader, a barcode reader, a signature capture device, an optical character recognition. In yet another embodiment, there is a power subsystem that powers the peripherals device and the handheld communications device. In another embodiment, the peripherals device comprises a plurality of processors and data collection devices that automatically reconfigure themselves to work with the communication device to which the peripherals device is connected.

DETAILED DESCRIPTION

Modular Case with Peripherals.

We describe a lightweight, yet impact resistant, intelligent housing which partially encases a PDA. The modular case serves two purposes: 1) it protects the PDA from damage resulting from drops, spills, etc. and 2) it increases the functionality of the PDA with the addition of multi-function peripheral processing.

Figure 1:
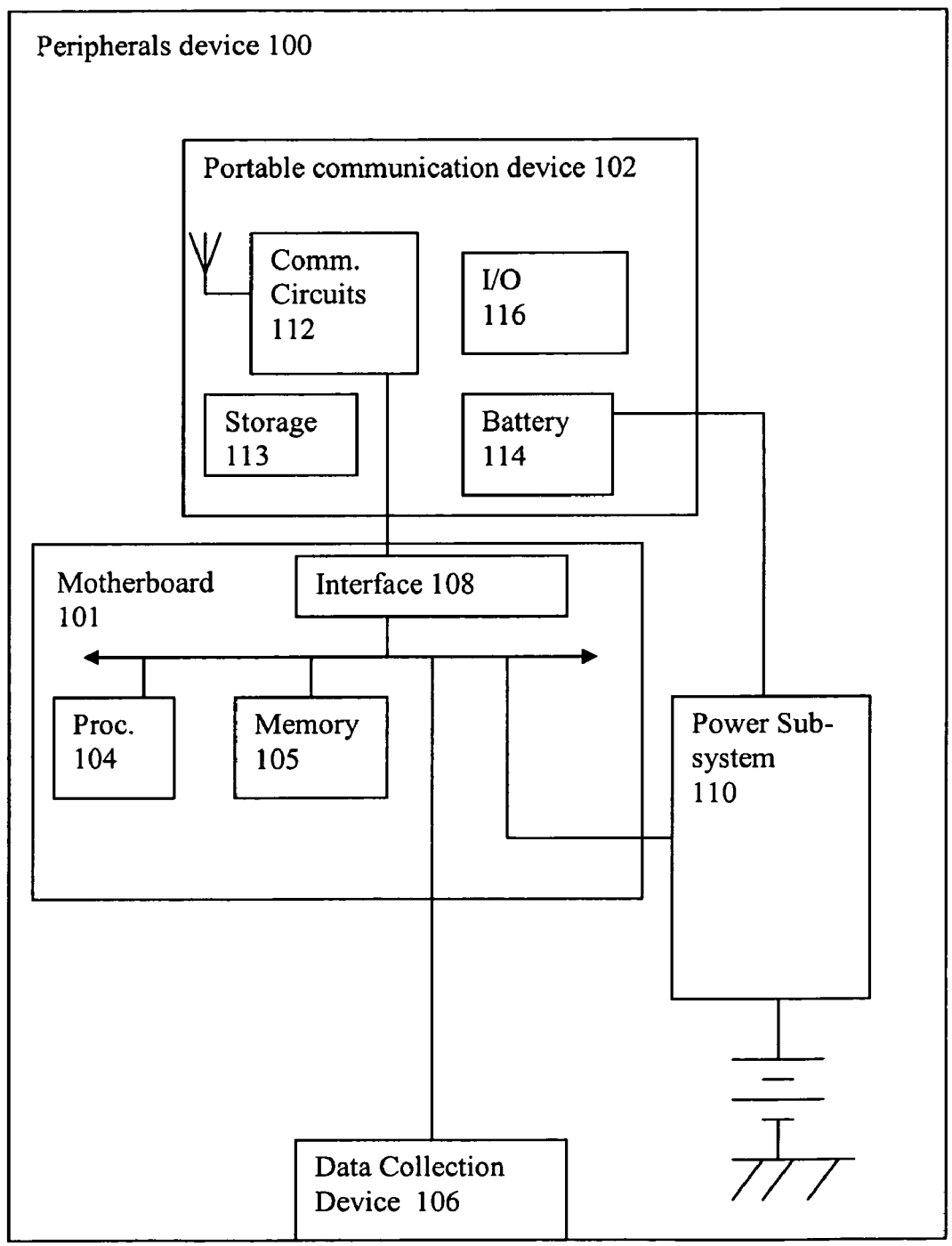
FIG. 1 is a high level block diagram of the modular housing for a handheld communication device using an embodiment of the invention.

As shown in FIG. 1, a peripherals (or host) device 100, for a PDA 102, includes: a circuit board 101, a removable handheld communication device 102, and a power subsystem 110. The circuit board 101 comprises: one or more processors 104; a main system memory 105, a data collection sub-system 106, and an interface 108 between the processor 104 and the handheld communication device 102 for providing a communication link with the portable communication device 102. The modular housing 100 uses the communication function of the device 102 to wirelessly transmit to a remote processor the data collected with the data collection sub-system 106. The housing 100 acts as a host for the handheld communication device 102 (also referred to as the guest device). The host device 100 includes functions that are complementary to those of the guest device 102 and is fully compatible with the guest device 102.

The guest device 102 is any of several commercially available handheld communications devices. For purposes of this example, we will discuss the BlackBerry™ communication device made by Research In Motion Corporation of Canada, although it should be understood that other handheld communication devices can function as guest devices. The guest device 102 comprises communications circuits 112, a native storage device 113, a native battery 114, and an input/output subsystem, 116 for communicating with a user. The communications circuits 112 include circuitry to enable a variety of communications, including a two-way radio, telephone, electronic mail. The storage 113 stores various items of communications and raw data, including emails.

It is important to note that the host device 100 does not have to be physically attached to, or in close proximity with, the guest device 102 in order for the host device 100 to perform functions. In one embodiment, the host device 100 can be connected to the guest device 102 by means of an additional wireless link (such as radio-frequency or infrared). Thus, the interface 108 can be a wireless communications link to the device 102. In this embodiment, the guest device 102 can either be updated or must already contain the other side of the wireless interface (the receiver) so that it can receive commands from a user of the host device 100 and comply with those commands. The guest device 102 already contains a communication interface by virtue of its being a wireless mobile phone, but may contain additional local limited distance wireless connection capabilities (such as WiFi, Bluetooth, Wireless USB, Zigbee, etc.). If the guest device 102 contains such a local, limited distance wireless capability, then all that has to be done is to provide a compatible wireless link to the host device 100 and an interface to the commands received from the user. The guest device 102 can be placed in a relatively safe place (e.g., its own case or in the users' pocket) and the host device 100 can be used in the field where its own ruggedized features protect it from impact and other damaging exposure.

Ruggedized Case.

Figure 2:
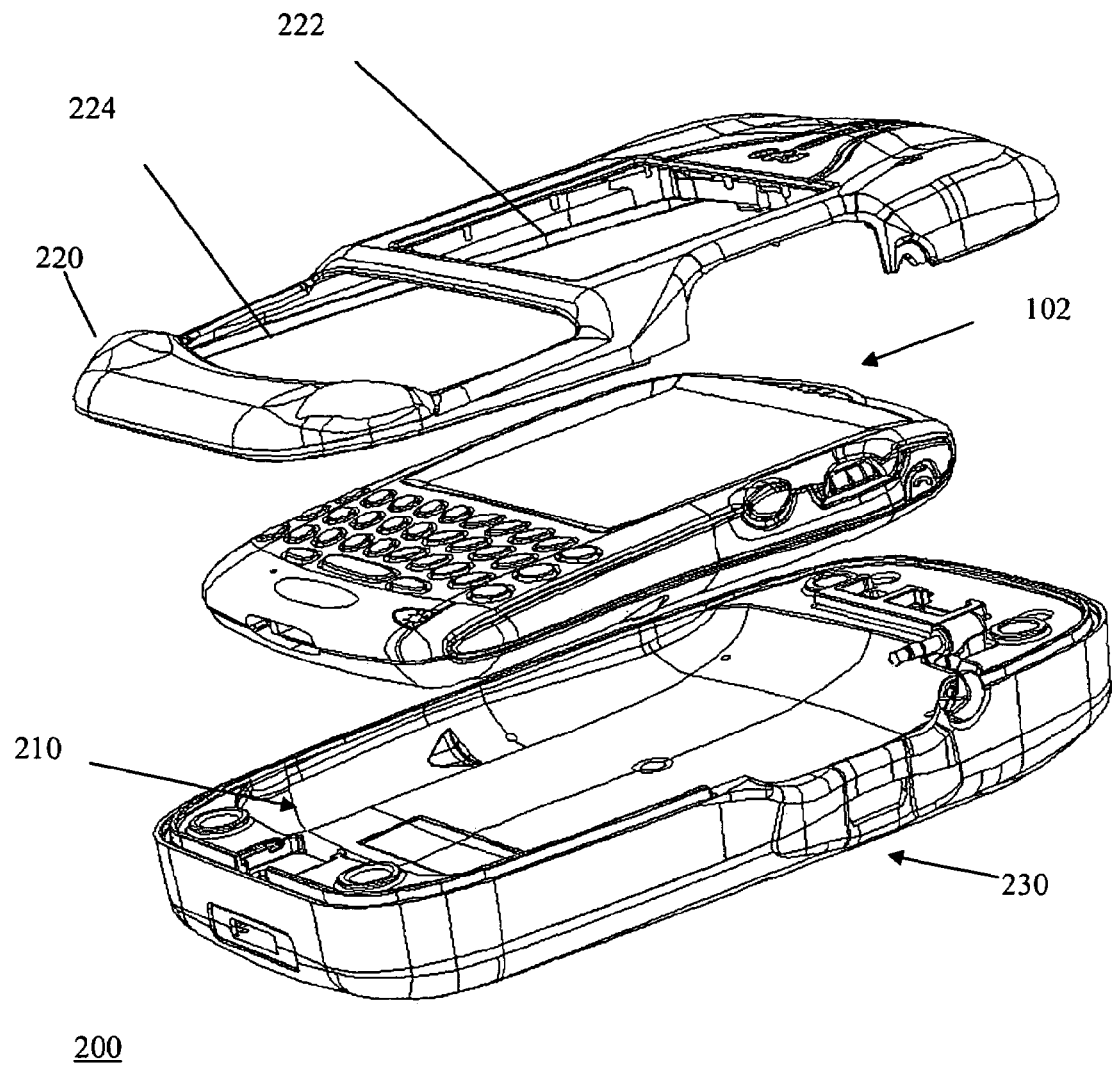
FIG. 2 is a perspective view of a top and bottom of a protective case with a conformal cavity for the handheld device.
Figure 2B:
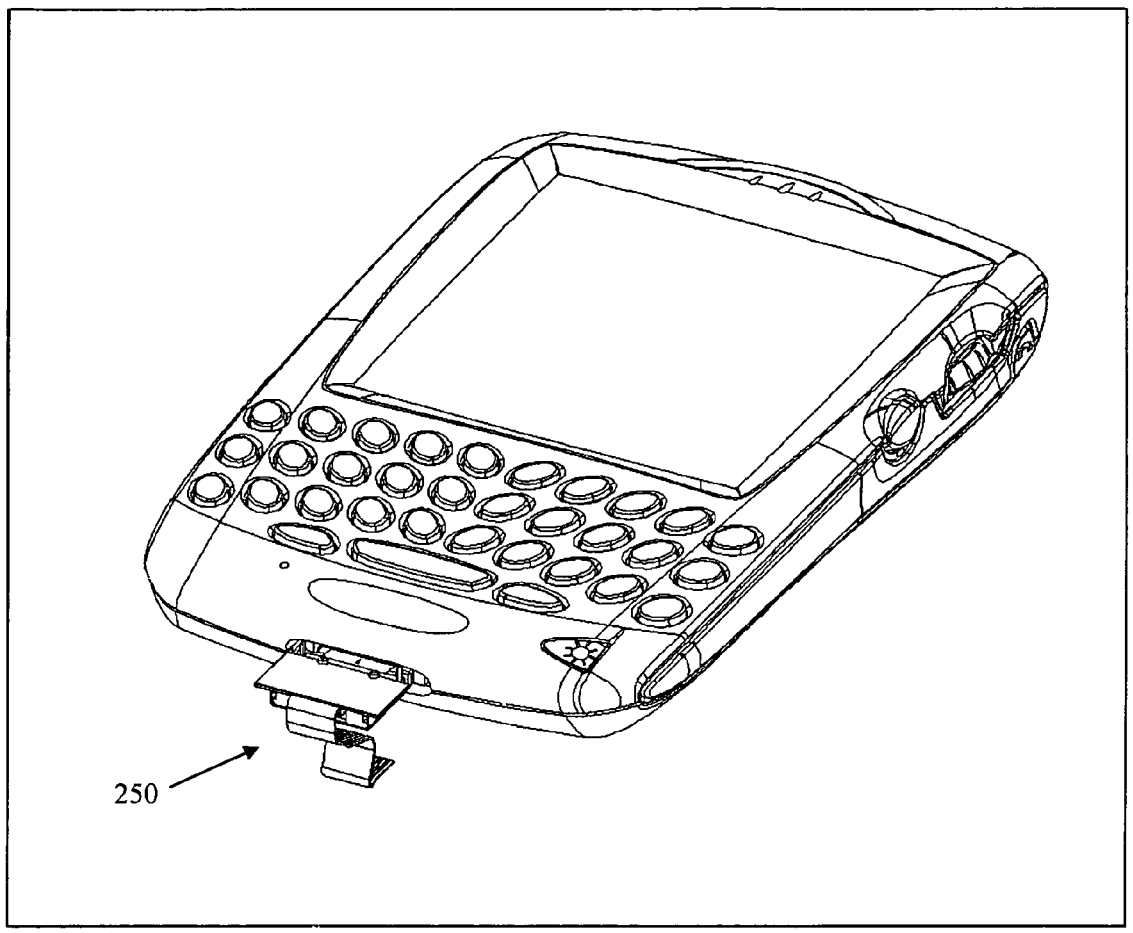
FIG. 2B shows a USB connector between guest PDA and the protective case interface.

FIG. 2 is a representation of the top and bottom portions of the host device 100, showing where the guest device 102 is positioned between the two. In this illustration we see that the host device, or case 100 takes the form of a form-fitted, ruggedized carrying case 200 for a guest device 102. In this embodiment, the modular housing 200 is a protective case that contains and attaches to a BlackBerry™. The case is preferably constructed out of a lightweight, yet highly durable material which is impact-resistant. Aluminum or metalized plastics are not recommended for the casing with embedded radio frequency antennas because they can interfere with signal strength. The case 200 includes a conformal cavity 210 for receiving the communication device 102. In a preferred embodiment, the case 200 conforms to the 72xx, 75xx, and 77xx series BlackBerry™ form factor and the conformal cavity is contoured to conform to the guest device 102. The top cover 220 fits over the central body structure 210 and attaches to the bottom cover 230. This top cover 220 comprises an aperture 222 for the guest device 102 display screen, an aperture 224 for the keyboard, and an aperture 226 for the scrolling and enter buttons of the guest device 102. Referring to FIG. 2B, the host device 200 includes a connector 250 that connects into the USB connector of the BlackBerry™ device and communicates therewith.

In this embodiment, the case 200 is specially built to carry the BlackBerry™ guest PDA device and is compatible with its functions. With the BlackBerry™ inside, the case 200 fits comfortably in the user's hand and does not add any noticeable weight. In this embodiment, a case 200, together with a BlackBerry™, weigh only approximately fourteen ounces (other embodiments may be lighter). The case 200 carries and protects the BlackBerry™ device and complements its functions. The case 200 preferably does not duplicate any function of the guest device (in this case BlackBerry™), but instead provides additional and complementary functions such as an image reader.

Conformal Cavity.

Figure 3:
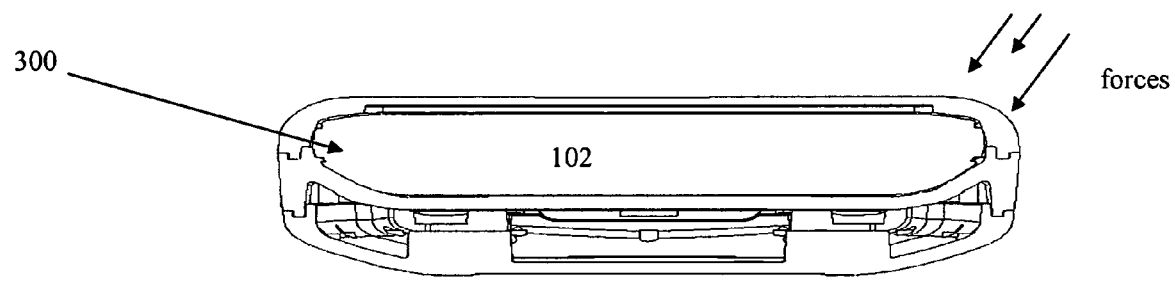
FIG. 3 shows a cross-section of the case with the guest PDA disposed within the conformal cavity of the protective case.

Referring to FIG. 3 there is shown a cross-section of the case 200 with the guest device 102 disposed within the conformal cavity 300 of the case. The purpose of the conformal cavity 300 is to allow the loading forces of an impact to be redirected around and away from the guest device 102 once it is positioned inside. It initiates a force redirection around the device 102, not through it. This is one aspect of the "ruggedizing" of the device.

The conformal cavity 300 forms a small "crush zone" for the guest device 102. This crush zone allows the case 200 to deform during impact loading and not transfer the impact energy to the guest device 102. The guest device 102 does make direct contact with the inner surfaces of the case 200. From the protection aspect, the main purpose of the case is to provide both a crumple (or deformation) zone to redirect and dissipate impact energy to prevent it from reaching the guest device 102. This is the design philosophy for the standard ruggedized cases.

For extreme ruggedization, in another embodiment the guest device 102 is additionally encapsulated in a thin shock absorbing gel (or silicon) case or layer and then placed inside of the plastic case 200. In this embodiment, the encased guest device 102 does not have direct contact with the inner surface of the case 200. During a side, oblique or corner impacts, the forces exerted onto the case 200 are redirected down to the lower decks and across the top cover. This force redirection theory can be applied in all directions.

Another protective aspect of the case 200 is highlighted with the use of an transparent protective window 504 (See FIG. 5) placed over the display screen of the guest device 102. The protective window fits into aperture 222. When an impact occurs directly to the viewable screen, the clear protective window of the case takes the loading and then transfers the forces away from the LCD screen of guest device 102. The LCD screens found in many electronics today are very susceptible to point impacts and cracking. By protecting the LCD from direct impact and redirecting the force flow around the device 102, damage is greatly minimized. Note that the a touch sensitive surface 1000 (FIG. 10) is applied to the transparent protective window on the active touch area is on the exterior surface of the protective window 302 when the assembled touch screen window inserted into the aperture 222 and thus is on the exterior of the protective envelope. This means that this input device can be damaged by direct pointed impact and thus another important feature is that the entire top assembly is designed as a field replaceable element.

Figure 3B:
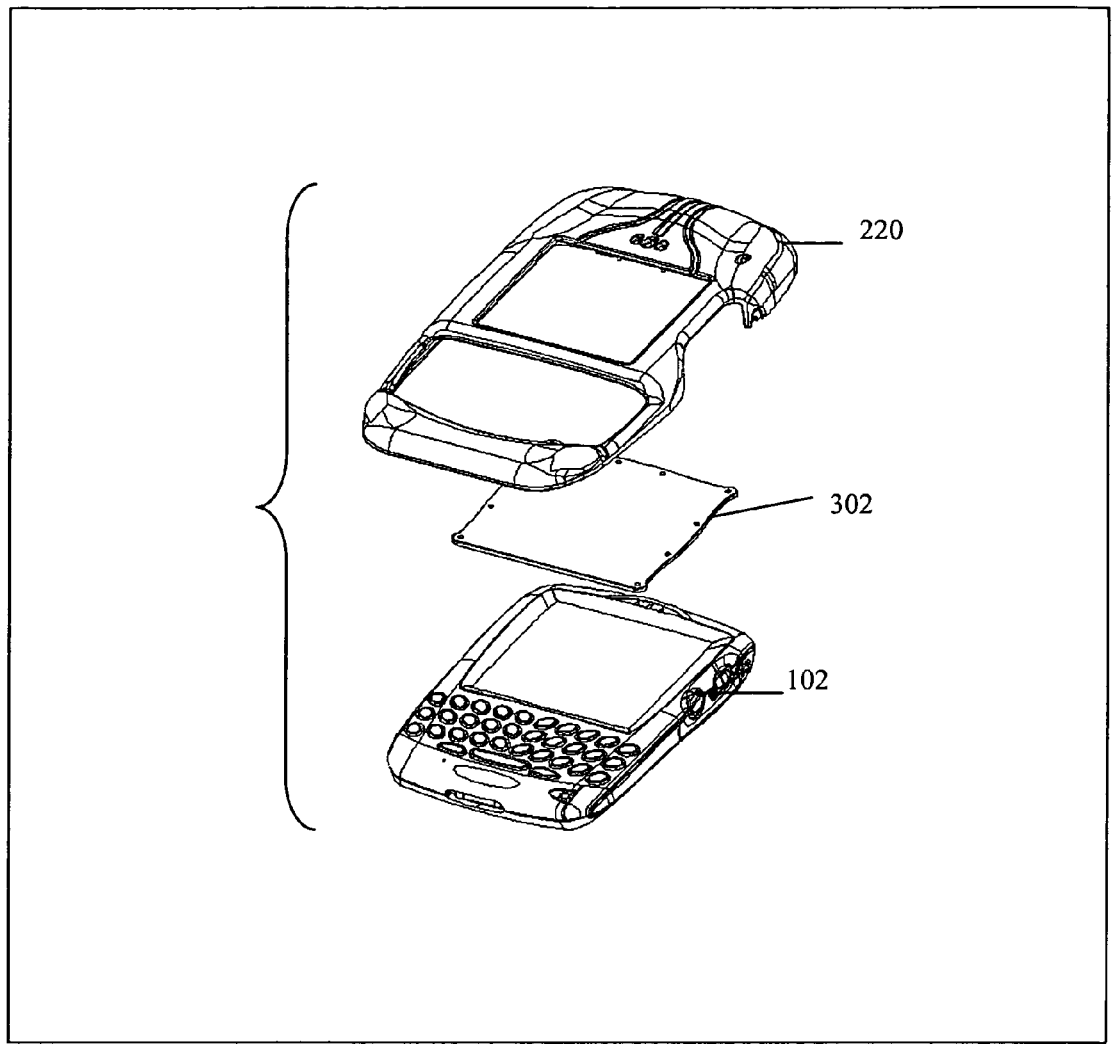
FIG. 3B shows the top part of the case positioned over the protective shield over the screen and the PDA.
Figure 3C:
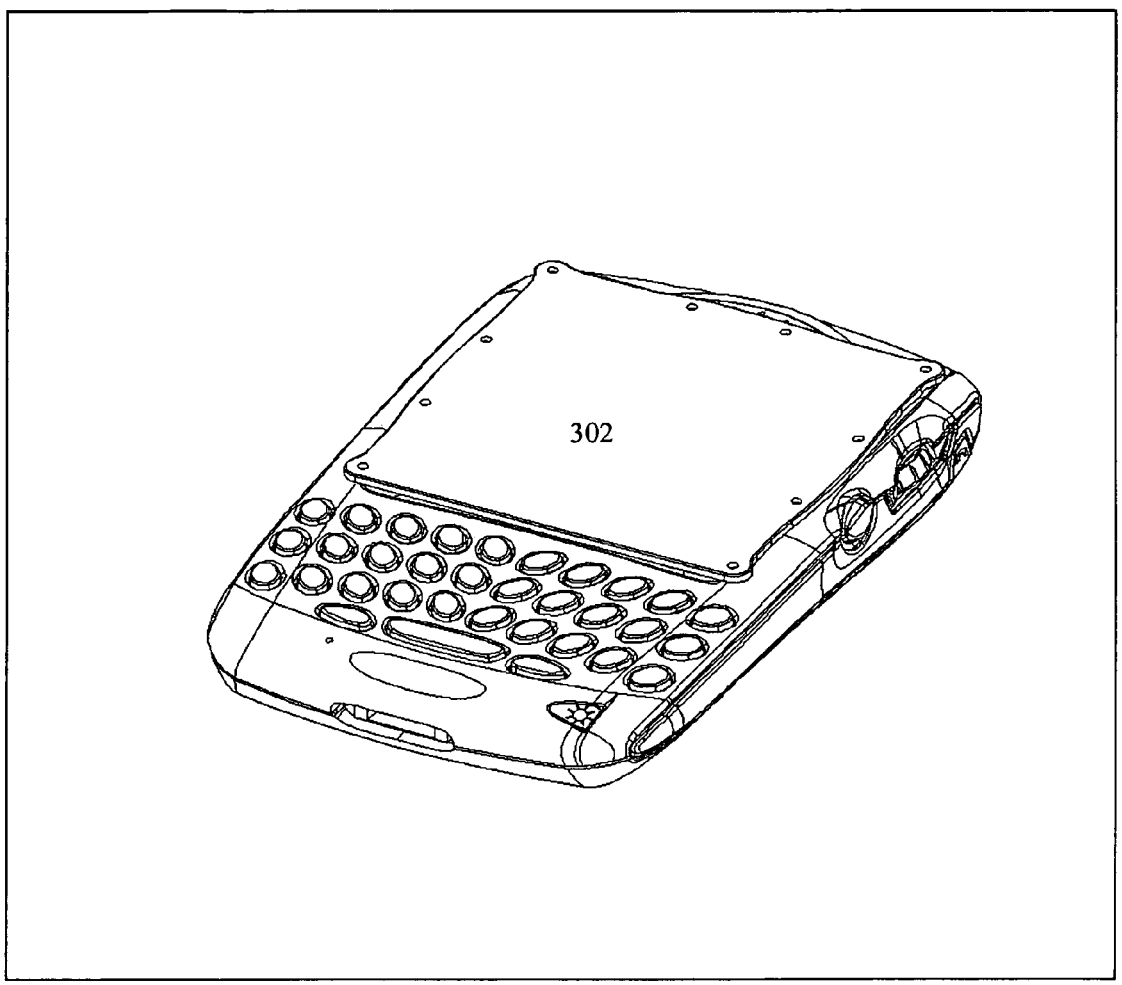
FIG. 3C shows the transparent protective shield positioned over the screen of the guest PDA.
Figure 11:
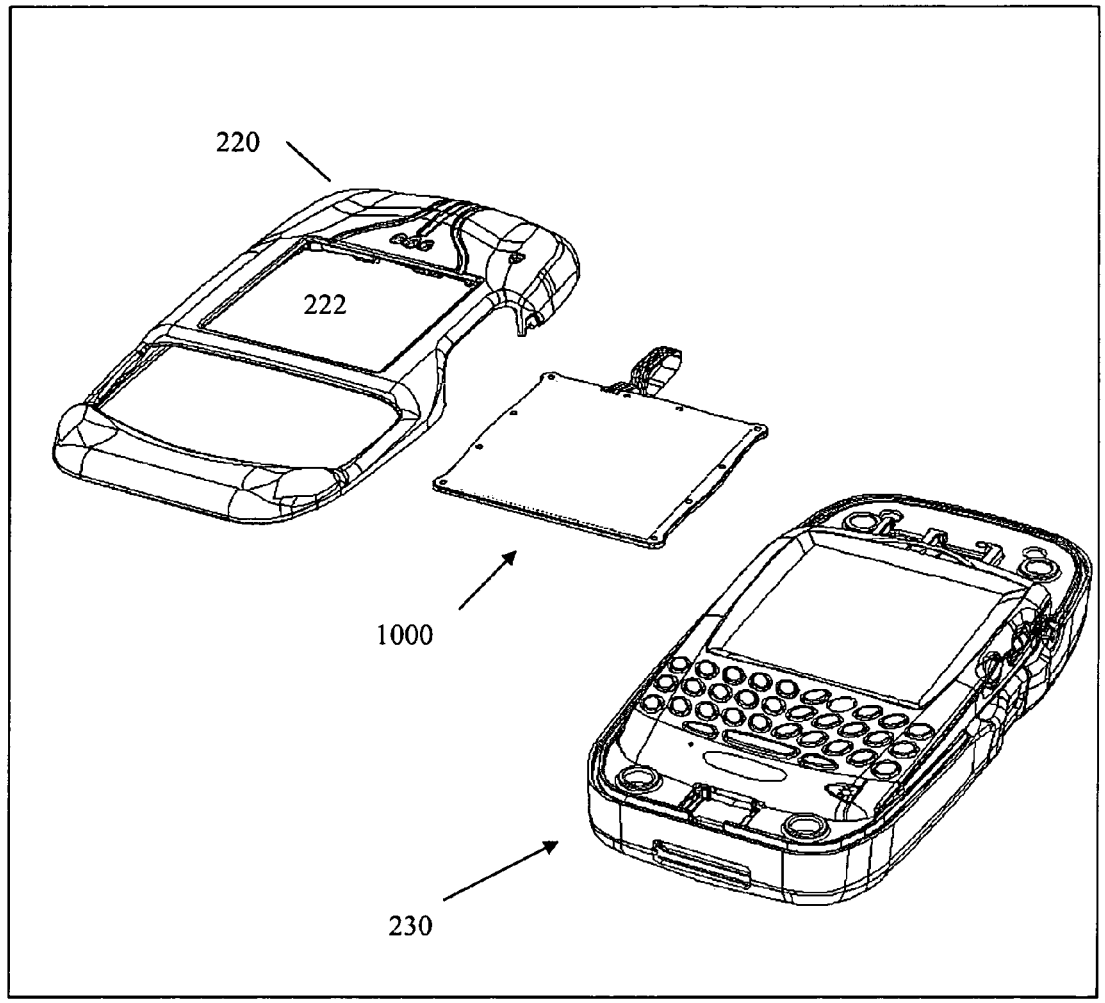
FIG. 11 shows how the touch screen assembly is positioned in the top cover over the display screen.

FIG. 3B shows the top part of the case 220 positioned over the protective shield 302 over the screen and the PDA 102. Referring to FIG. 3C, a transparent protective touch screen window 302 is shown positioned over the screen of the guest PDA without being inserted into the aperture of the top cover 220 and illustrates how this device protects the guest PDA's screen from impacts in the identical manner of the non touch screen window (FIG. 11)

I-Beam Structure.

Figure 4:
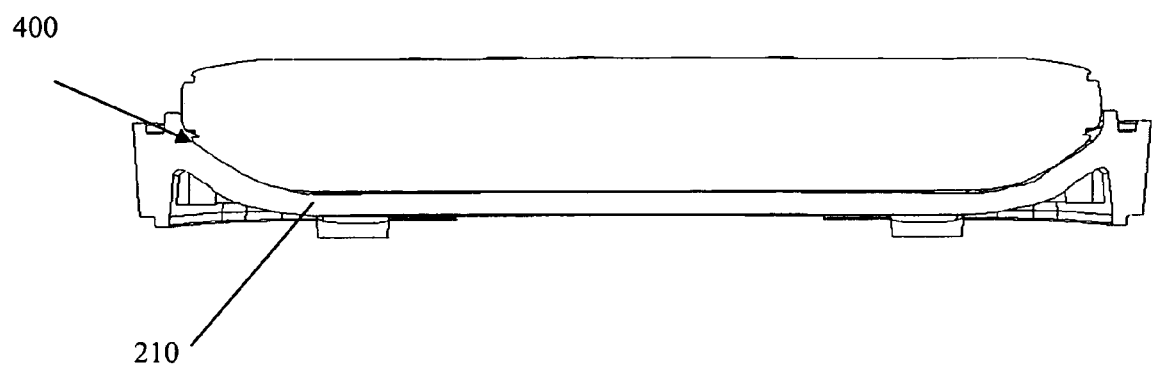
FIG. 4 shows, in cross section, an embodiment of a guest PDA and peripherals device wherein the peripheral device uses an I-beam structure and curved surfaces.

Referring to FIG. 4, the assembled case 200 contains a central body structure 210 which has an I-beam cross section. I-beams are well-known lightweight mechanical structures with an I- or H-shaped cross-section and are known for their ability to carry bending weight. They are widely used in the construction industry and are often seen in bridge construction. Although steel cross-members on bridges are probably the most visible example of I-beam construction, it is important to note that the I-beam design has been incorporated into structures of far less weight and resist deformation when bending loads are applied. Flexible webbing made using I-beams take advantage of the structure's ability to resist deformation and distribute bending loads.

Referring again to FIG. 4, in another embodiment, the case 200 uses an inter-locked web design with an I-beam structure and curved surfaces 400 for directing forces into the I-beam web which absorbs or distributes the force away from the guest device 102. In this case "web" means a central connective plate structure, as in the vertical bar of a capital "I" from whence the term I-beam comes. The flanges are actually the outer ring of the shell. The I-beam web is the bottom tray of the conformal cavity. This provides a strong, inherently flex resisting structure.

The more general approach is re-directing forces that impact the case 200 such that their vectors are not incident on the device being carried. A specific aspect of the design is to avoid direct contact between the encased device 102 and the inner surface of the case 200.

Sensor Clip.

Figure 5:
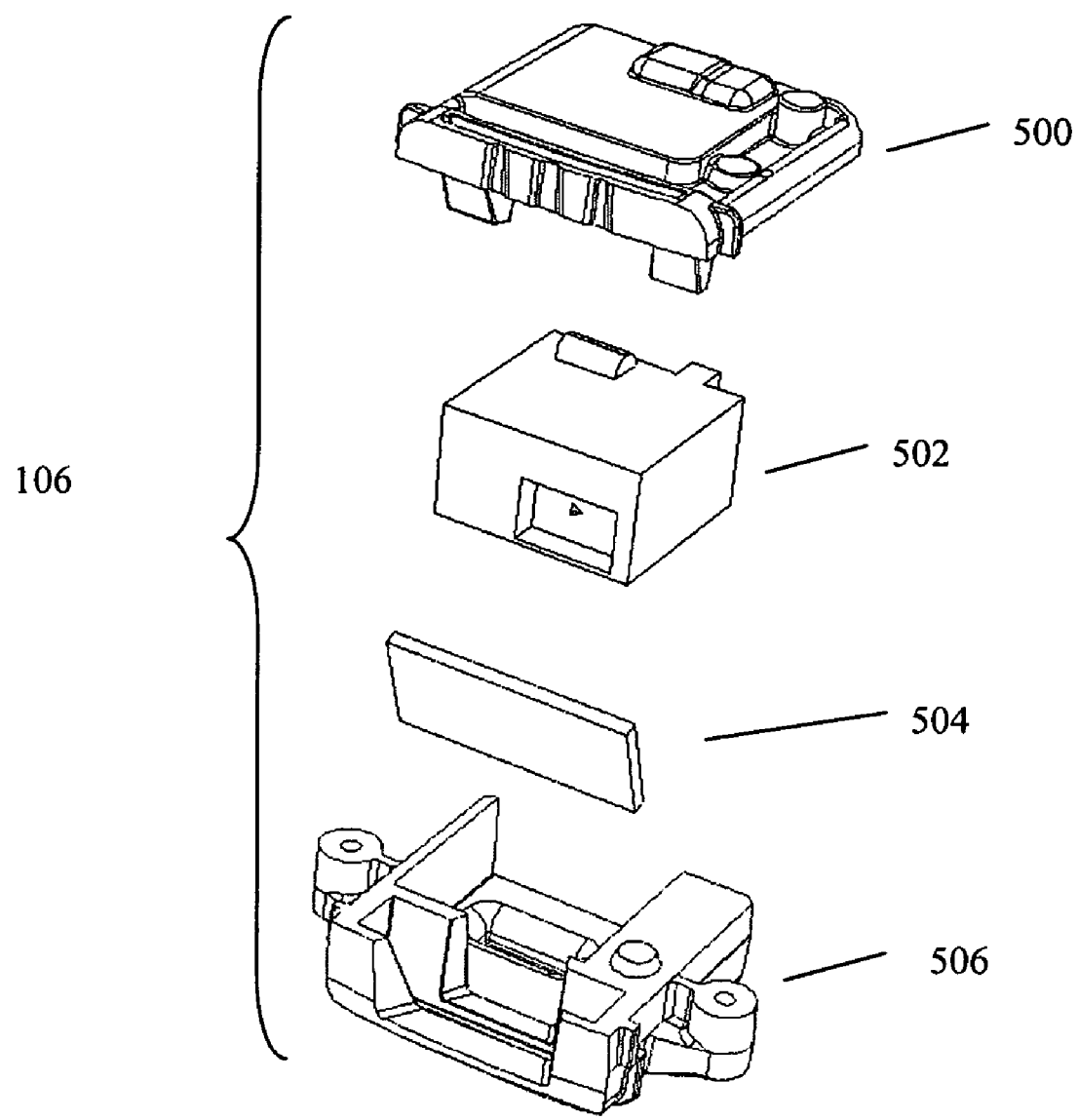
FIG. 5 shows the four main parts of a sensor clip.
Figure 6:
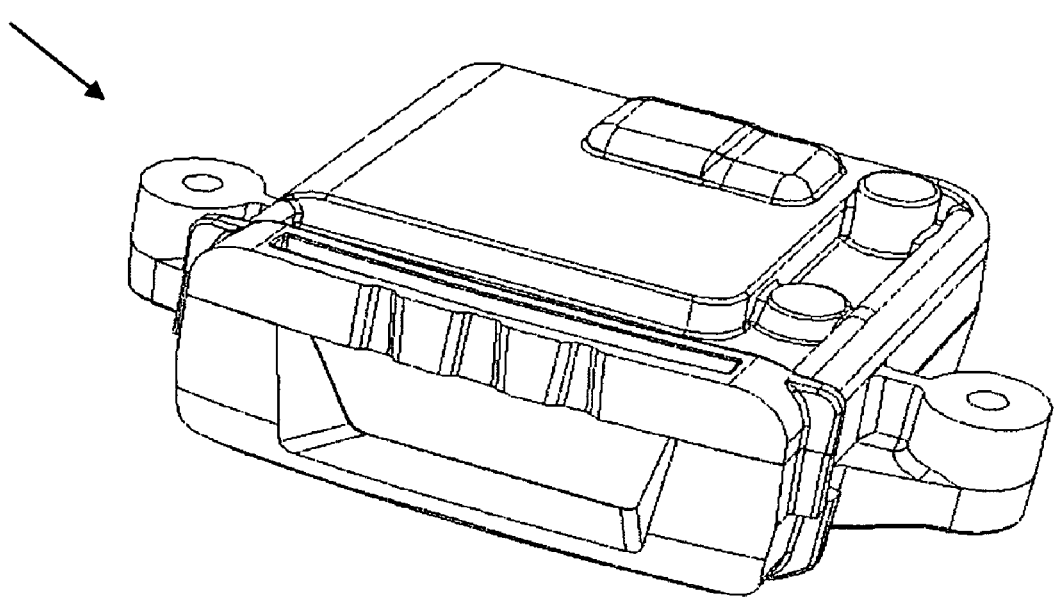
FIG. 6 shows a perspective view of an assembled sensor clip.

Referring again to FIG. 1, the modular housing 100 includes the data collection device (or sensor) clip 106 that can provide for sensors using line-of-sight data gathering capabilities (such as laser scanners, cameras and others) and couple the data captured to the secure wireless communication function of the guest device 102, for example to transmit the collected data to a directly remote location for immediate processing. This sensor clip 106 can be removed or added as necessary to address different sensing requirements. FIG. 5 shows the four main parts of a sensor clip 106: the upper plastic sensor clip 500, the sensor 502, the protective window 504, and the lower plastic sensor clip 506. FIG. 6 shows a perspective view of a sensor clip 106.

Figure 7:
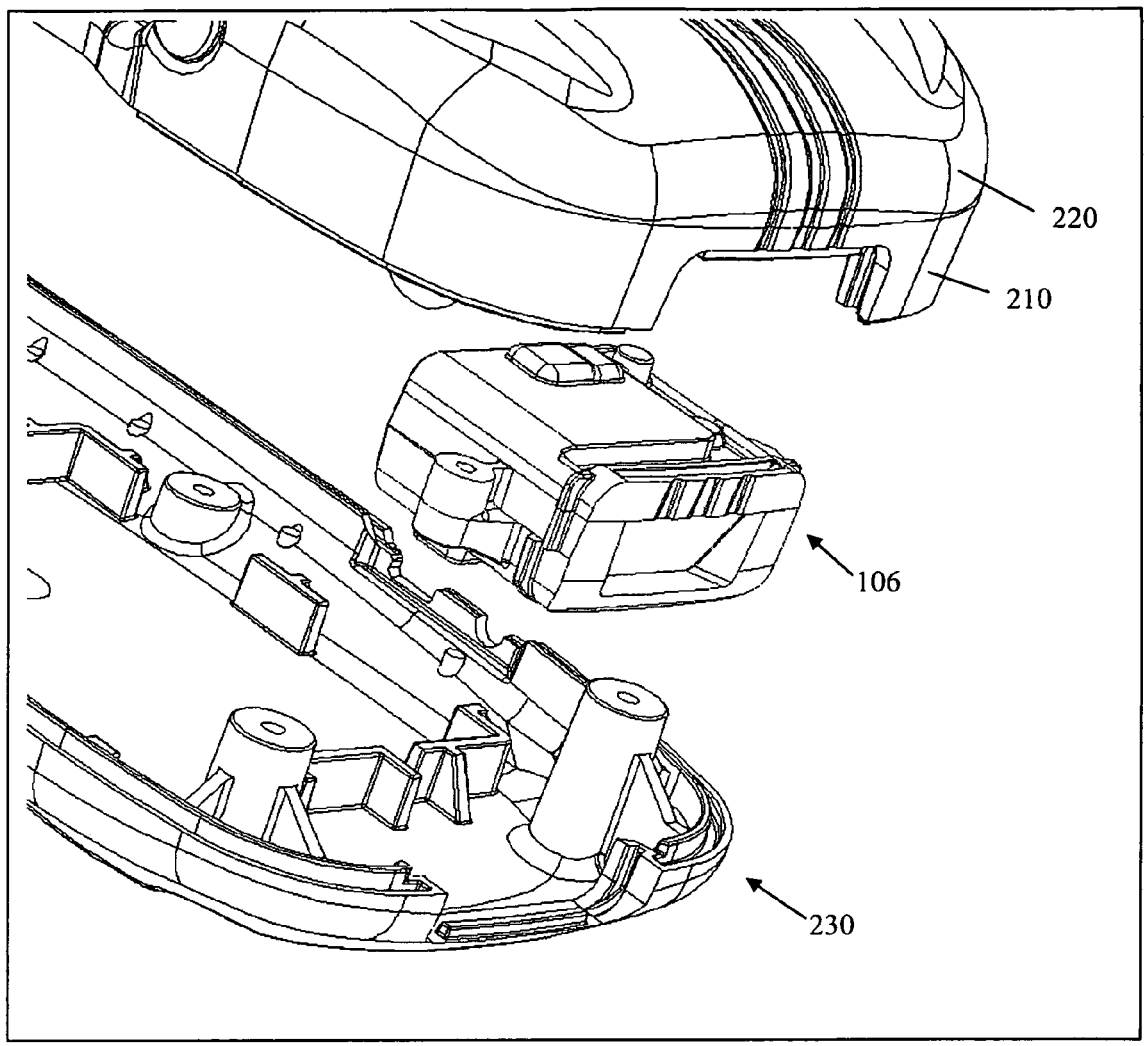
FIG. 7 shows how the sensor clip is positioned between the top and bottom portion of the case.
Figure 8:
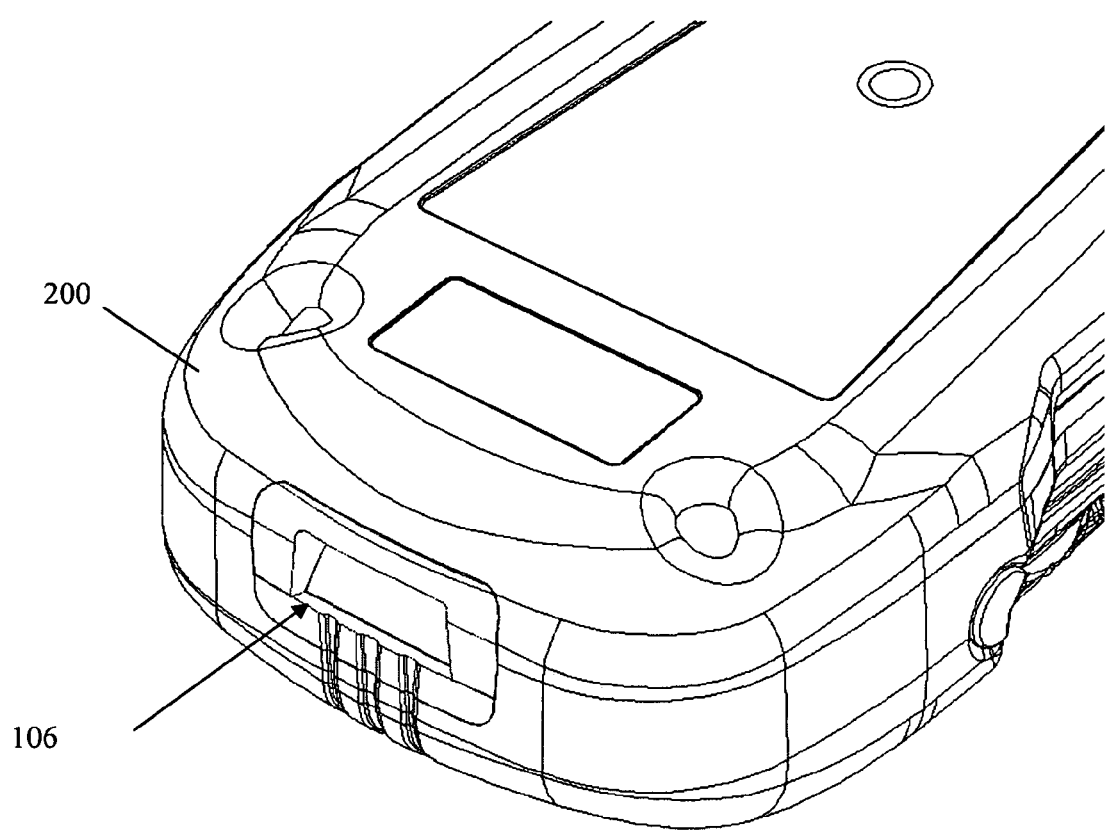
FIG. 8 shows the end portion of the sensor clip as seen through an aperture of the assembled case.
Figure 9:
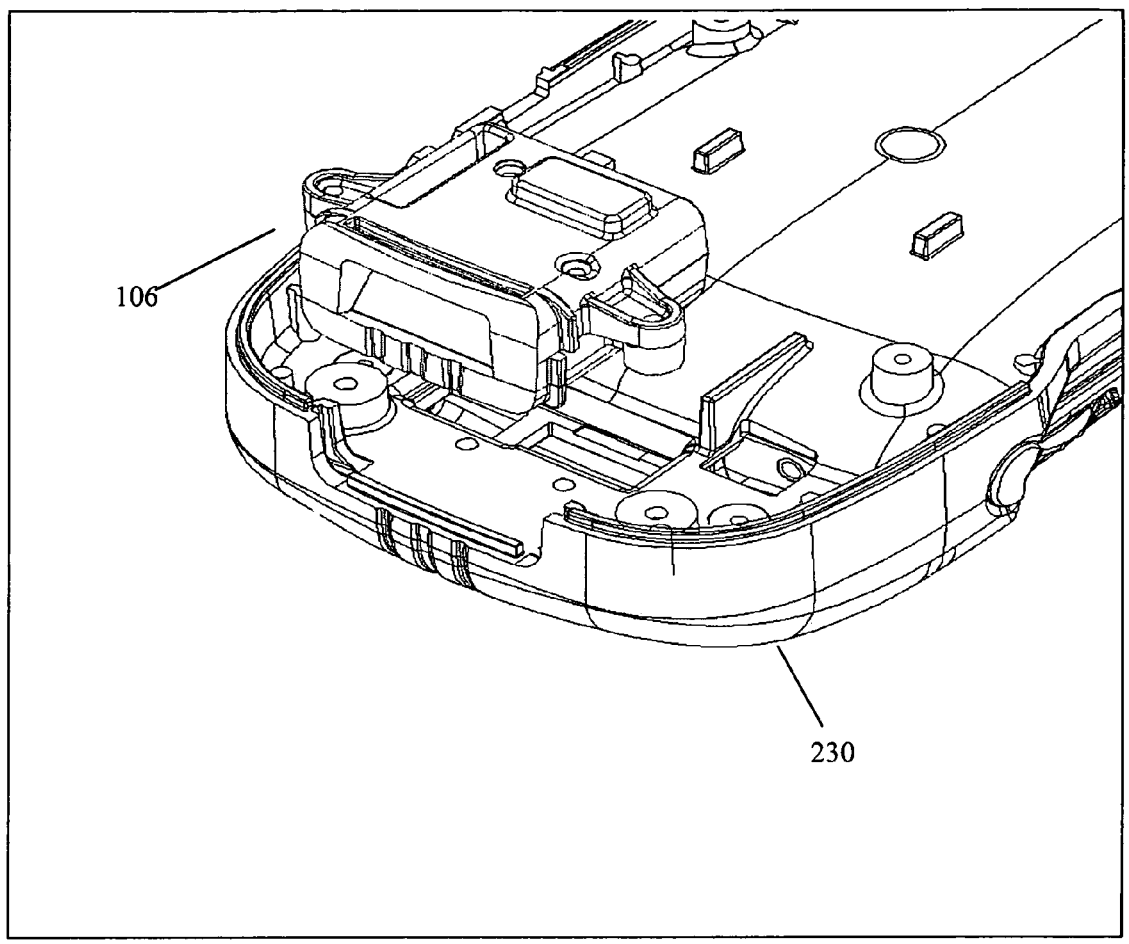
FIG. 9 shows a perspective view of a sensor clip positioned over a bottom portion of a case.
Figure 9B:
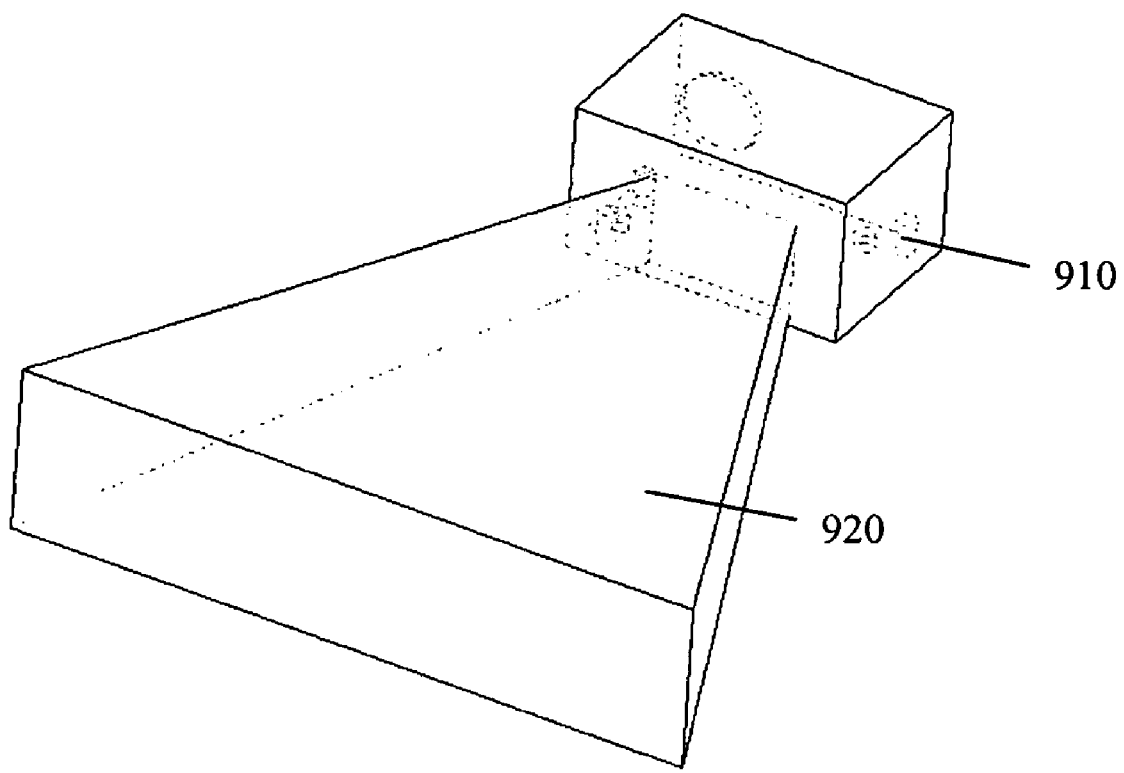
FIG. 9B shows a bar code scanner.

FIG. 7 shows the positioning of the sensor clip 106 between the central body structure 210 and bottom 230 portions of the case 200. Both the central body and bottom portions of the case 200 contain a small molded cavity sized to the exact specifications of the sensor clip 106 so that the sensor clip 106 fits snugly when encased and does not move out of place even during an impact. Note that the sensor clip 106 is positioned at the head end of the case 200 and the bottom of the sensor clip 106 is visible and accessible through a built-in aperture in the head ends of both the central body structure 210 and bottom 230 portions of the case 200. FIG. 8 shows the end portion of the sensor clip 106 as seen through the head-end aperture of the case 200. In FIG. 9 we show a perspective view of a sensor clip 106 positioned directly over the bottom portion 230 of the case 200. This view shows how the cavity that accepts the sensor clip 106 is molded to the exact specifications of the sensor clip 106. One possible use for a sensor device is a bar code reader. FIG. 9B shows a bar code scanner 910 and the span of the scanner 920.

In yet another embodiment of the case 200 the sensor clip 106 includes a barcode reader that reads a barcode image in a single pass in any direction or location. This is done by using a high-resolution camera or a conventional bar code reading laser. The case 200 may also include additional optical-character recognition ("OCR") functions. The data collections device 106 can also be applied as a biometrics fingerprint reader to authenticate the user of the device 102. The case 200 manages the peripheral devices that all attach to the Black-Berry™ device 102. The modular housing 200 is highly scalable by including features such as the modular data collection clip 106 that can be an image reader, barcode reader, credit card reader, fingerprint reader and the like. All of these features can be added or removed and updated by using a module that has the same form factor, regardless of what functionality it provides.

The data collection sensor clip 106 is physically located near an end of the case so that it can sense and collect information in the field, convert it to a form suitable for processing and transmission. Alternatively, the data collected can be retained in the storage space 113 of the host device 200 and some degree of processing can be done locally then accessed and transmitted by the guest device when communications are appropriate. The guest device 102 can be carried around outside the case 200 when the host device 200 is connected via wireless to the guest device 102.

Touch screen.

Figure 10:
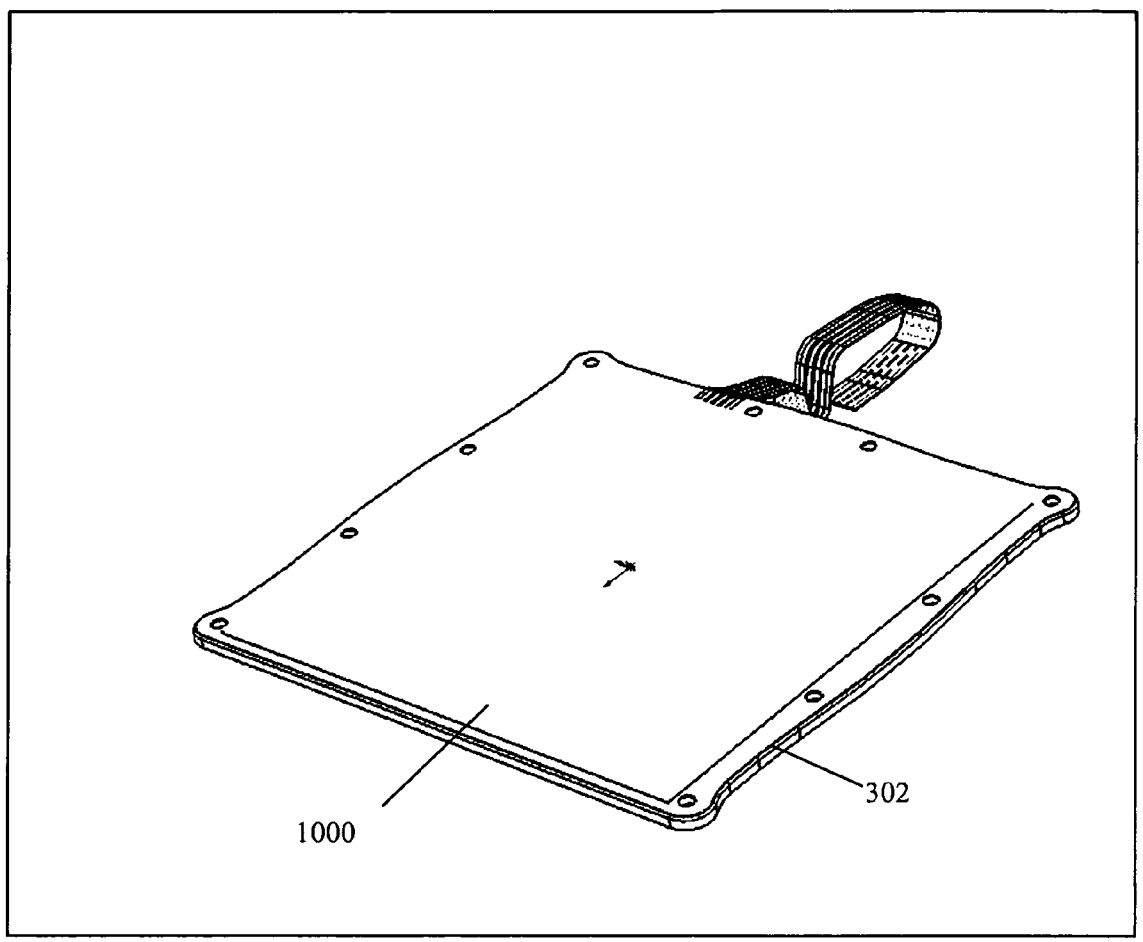
FIG. 10 shows a touch screen device assembled on the transparent protective shield.

Referring to FIG. 10, there is shown a touch screen 1000 which can be used in one embodiment of the invention. This touch screen 1000 is a touch sensitive window meant to cover the display screen of the guest device 102. The touch screen 1000 is preferably constructed of two layers of film with a gel interposer. The interposer has the ability to change the voltage potentials. The touch screen 1000 is fabricated using the plain protective window 302 as its substrate.

In FIG. 11 we see how the touch screen 1000 is disposed directly over the display screen of the guest device 102, according to an embodiment. The LCD screens found in many electronics today are very susceptible to point impacts and cracking. The top cover 220 is constructed with an aperture 222 sized to frame the touch screen 1000 so that the touch screen 1000 is bound at its edges by the framing of the aperture. Once the touch screen 1000 is in place, the top cover 220 can be fitted over and interlocked with the central body structure 210. When the case 200 is closed, the touch screen completely covers the guest device 102 display screen. The touch sensitive window 1000 captures button events and signature stroke data generated with a stylus. Conventionally the substrate material for touch screens has been glass but in this embodiment the substrate is a clear, impact resistant material. One such material is polycarbonate plastic and one common GE polycarbonate is LEXAN. With the touch sensitive surface applied, LEXAN can sense the touch of a user or a user's stylus and convert that information or instructions into the user command format of the guest device 102. Thus, if the device 102 does not include a screen that is touch sensitive, the host device 200 provides a touch screen 1000 that acts as an overlay or interposer over the screen and converts the touch information. The touch screen 1000 overlays the BlackBerry™. Display and provides the user another form of control over the BlackBerry™ device and expands its capabilities such as but not limited to virtual buttons, drawing, note taking and signature capture. It allows the guest device 102 view window to perform in both protective and touch sensitive roles.

Replaceable Connectors.

Figure 12:
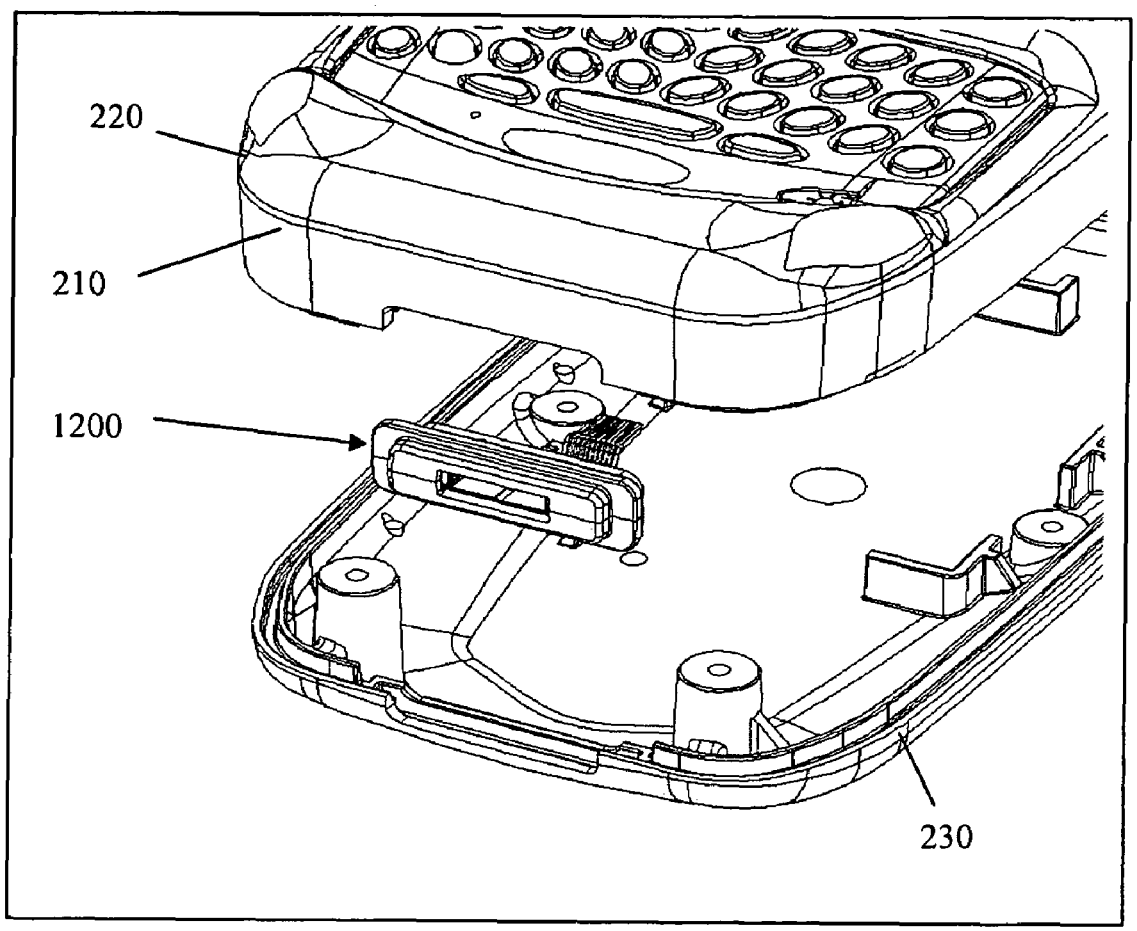
FIG. 12 shows a replaceable connector positioned in the cradle end of the case.

In another embodiment of the invention, a replaceable cradle connector can be inserted into the case 200 to expand its functionality, durability and maintainability under conditions which may "wear out" normal connectors faster than usual. The replaceable cradle connector of the case 200 is designed to allow various styles of I/O connectors to be used in the same cradle location. Referring to FIG. 12, the cradle end of the case 200 has a recessed cavity that accommodates a specially designed plastic clip 1200. This clip 1200, as shown in FIGS. 7 and 9, can be molded to fit over a multitude of connectors. For instance, a low cycle I/O connector can be field replaced with a high cycle connector of a different configuration with the assistance of a plastic connector adapter.

Figure 13:
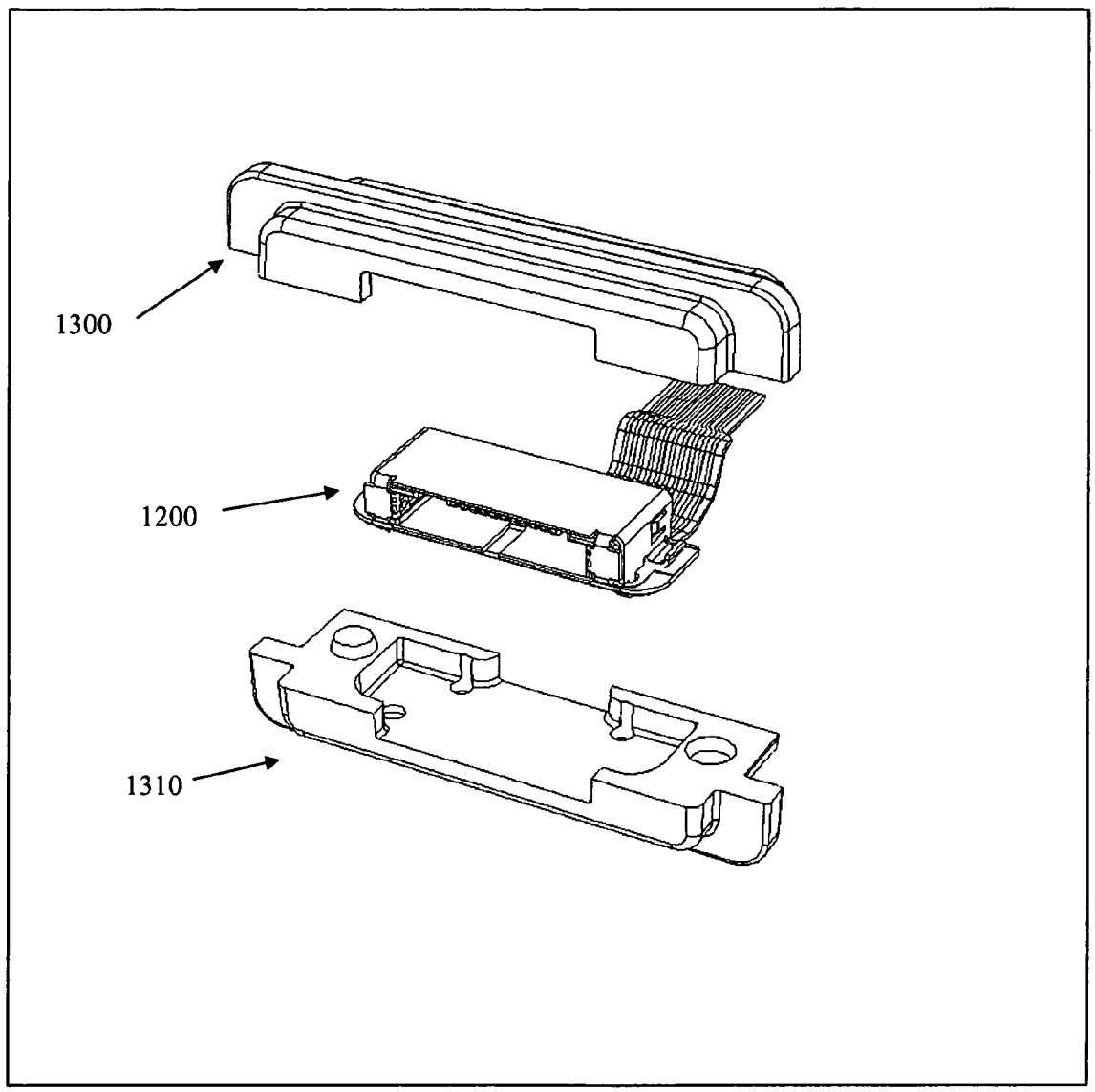
FIG. 13 shows the three main parts of a replaceable connector.

Referring to FIG. 13, there are shown the three main parts of a replaceable connector 1200. The connector 1200 is held in place by upper 1300 and lower 1310 brackets.

Global Positioning System.

Figure 14:
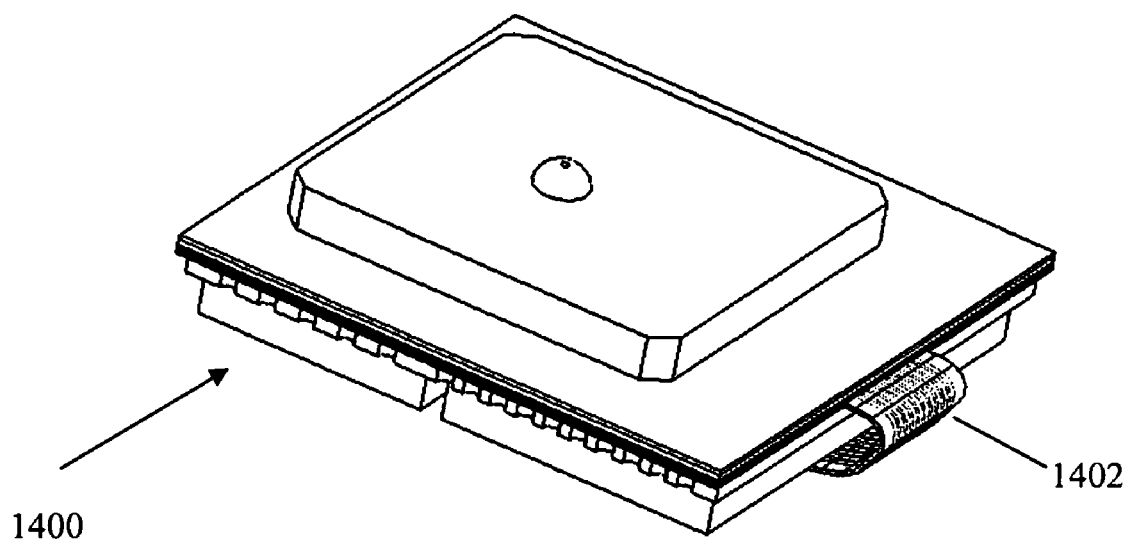
FIG. 14 shows a compact GPS.
Figure 15:
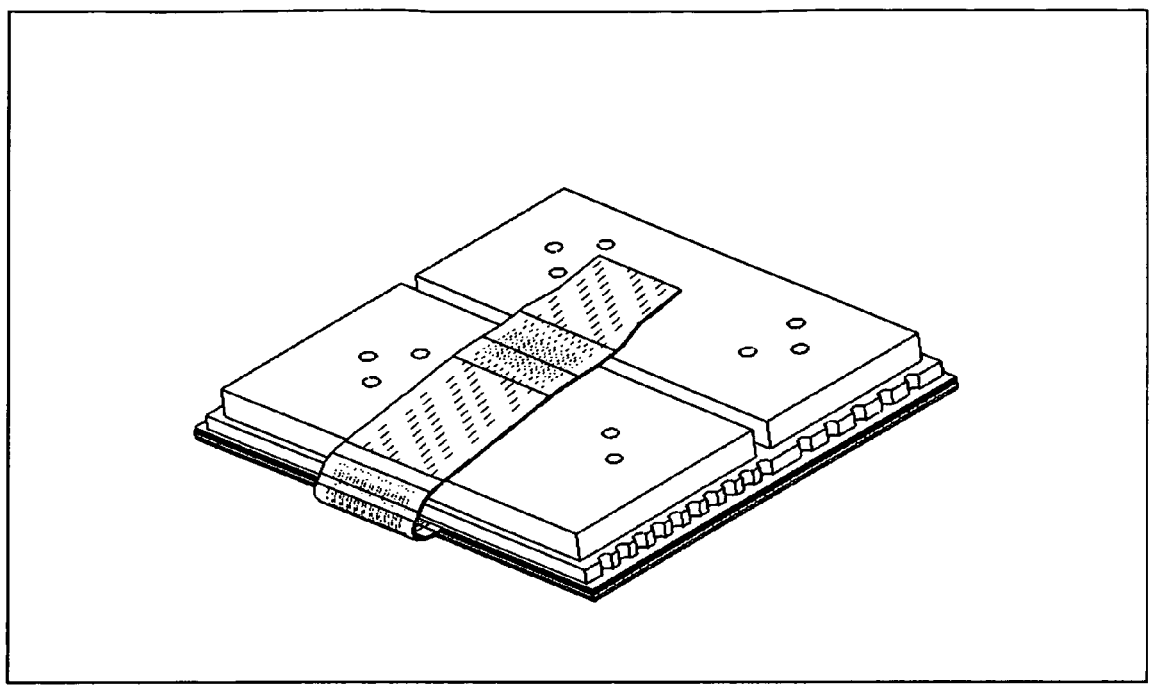
FIG. 15 shows the other side of the compact GPS

Referring to FIG. 14, the peripherals device 100 optionally includes a global positioning system (GPS) 1400 that allows the user to determine the location of the unit 200 at any time. In this embodiment, the GPS module 1400 marries the built-in antenna 1402 and receiver together into a single integrated unit where the antenna is on one side of a multi-layer "rigid flex" substrate and the receiver is on the other. The antenna is connected to the receiver with an impedance controlled buried strip line. The importance of this embodiment is that the radio-frequency (RF) section is co-located with the antenna and the RF connections are a "designed in" rather than an "assembly" function and further that the power and data signaling between the GPS receiver and other devices is carried over a less critical flex or jumper cable connective circuit. Another importance of this embodiment is that, in times of emergency or remote locations, the GPS module 1400 used in this form works directly from the satellite net and is thus suitable for continued field data and location collection operation with the guest device when away from cellular net where only assisted GPS (AGPS) may be available or when the local cellular net is not functioning. It is important that the antenna 1402 is small and correctly connected to the receiver to assure high performance while maintaining the small size of the device 200. FIG. 15 shows the other side of the compact GPS 1400.

Case Interlocks.

Figure 16:
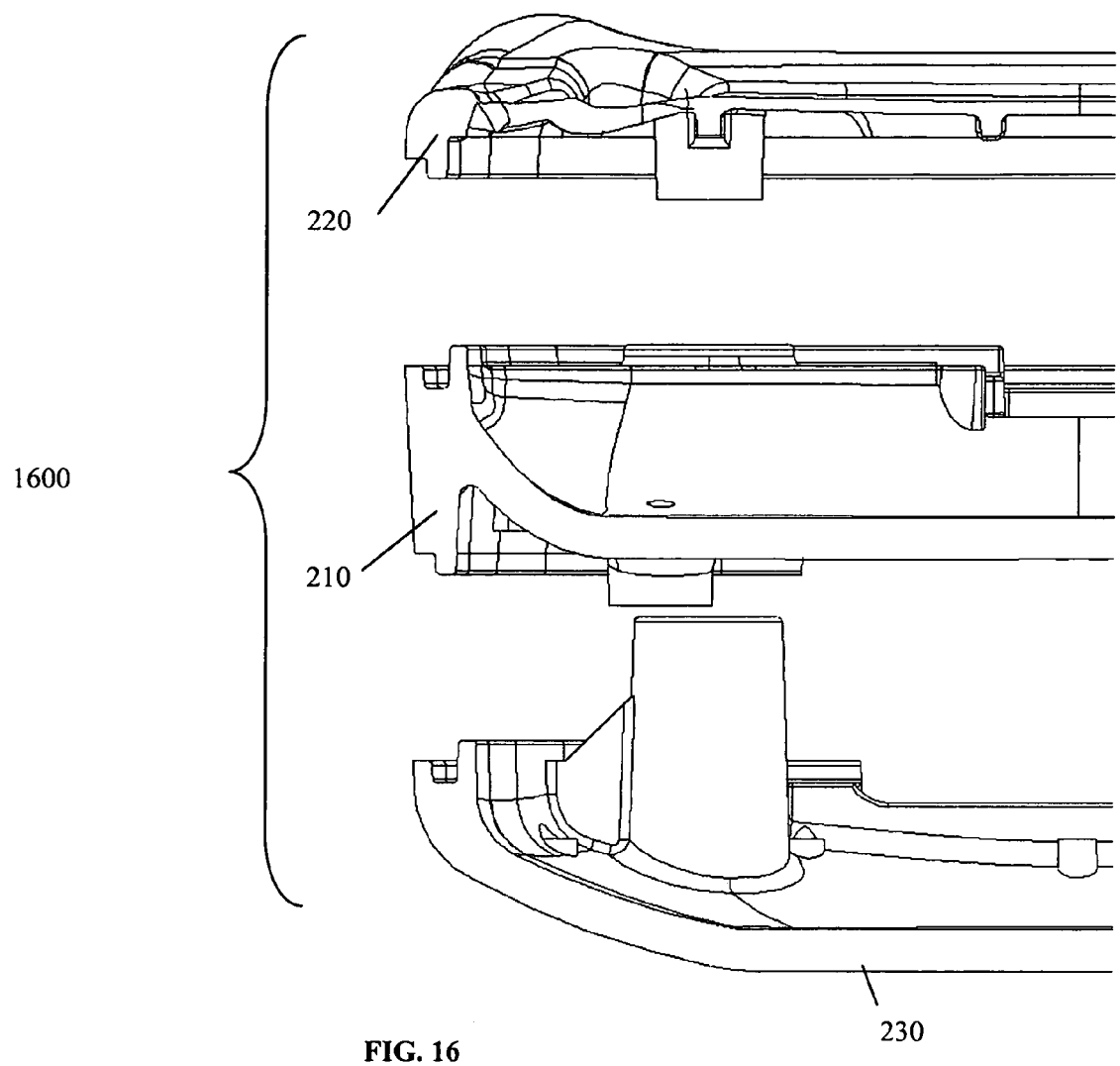
FIG. 16 shows the placement of the case interlocks.

The purpose of case interlocking is to allow the individual case bodies, top 220 and bottom 230, to share the loading forces of an impact. Referring to FIG. 16 we see the placement of the case interlocks 1600 between the main plastic housings of the case 200. This design feature greatly minimizes sidewall bulging. By using a heavily reinforced back lap interlock between the top and bottom cases the overall case strength is increased. During an impact, the interlocks are driven together and the forces are more easily transferred to the other case bodies. This sharing of loads allows the cases to withstand higher loading than a simple edge interlock.

Figure 17:
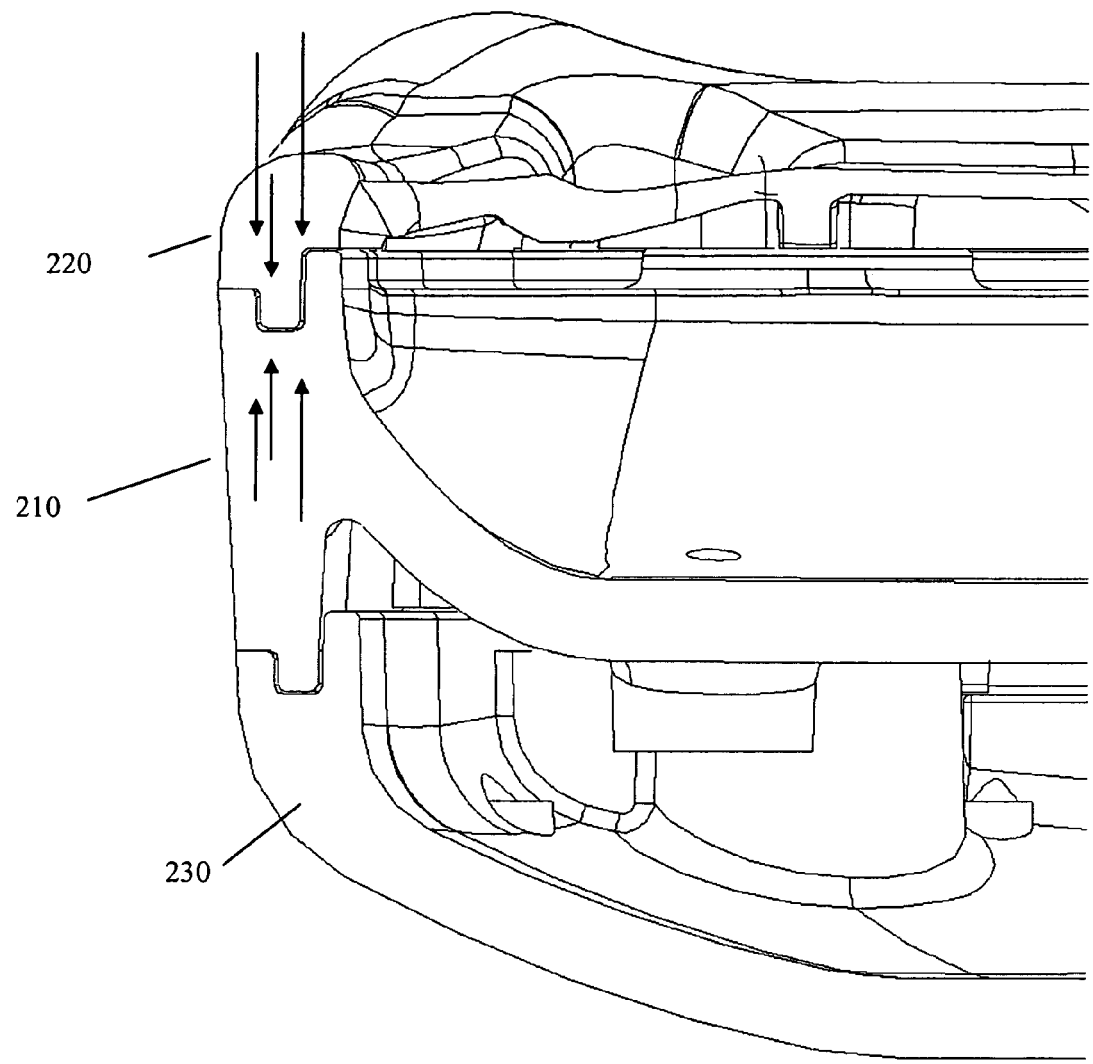
FIG. 17 shows an example of vertical loading on the case interlocks.

In vertical loading, shown in FIG. 17, the male-female interlocks are driven into each other. This driving force "locks" the bodies together and helps with load transfer. The forces are shown as vertical arrows. The extended inner reinforcement prevents the edges from popping inwards towards the device 102 and electronics. The outer reinforcements prevent the seams from blowing out.

Figure 18:
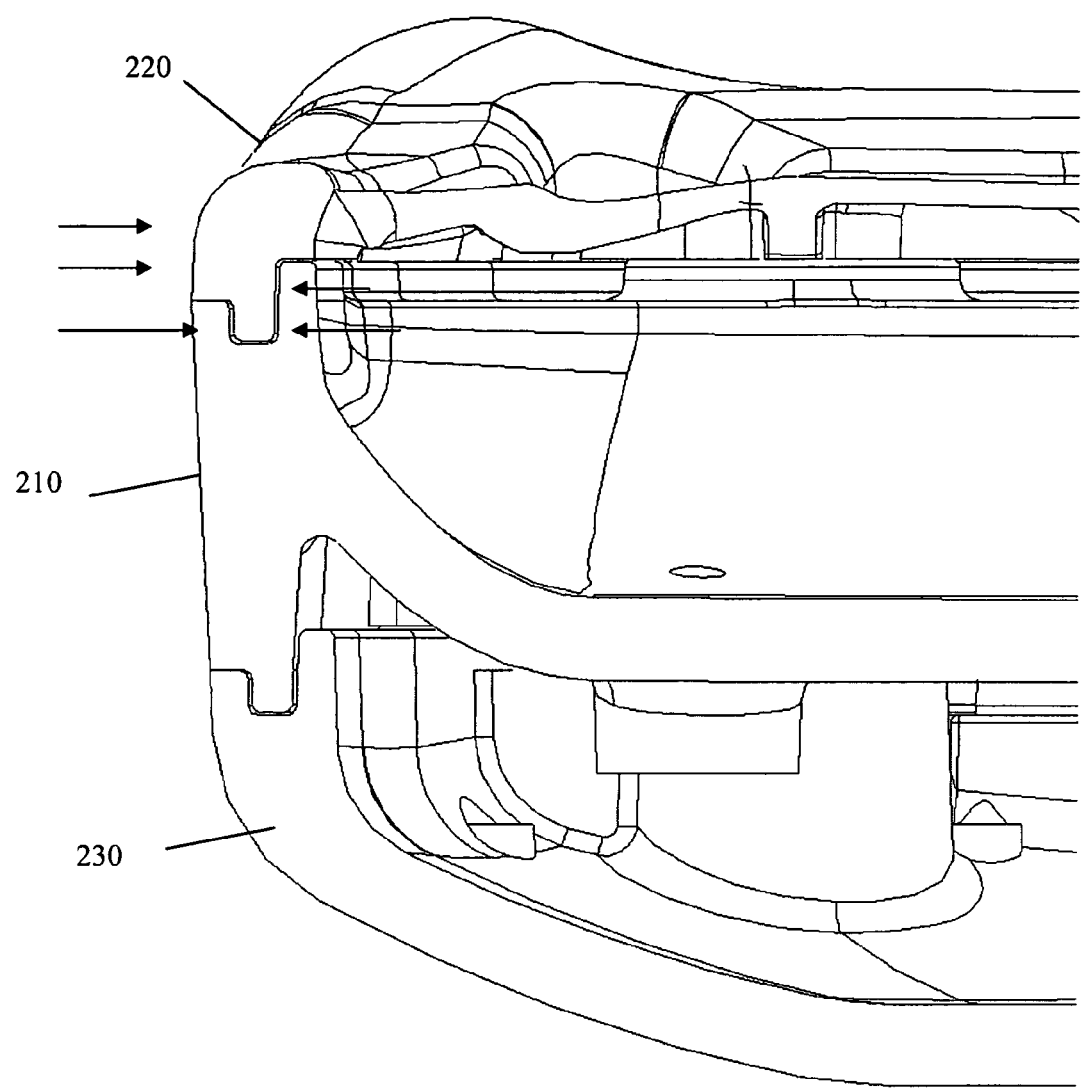
FIG. 18 shows an example of side loading on the case interlocks.

In a side impact, as shown in FIG. 18, these interlocks offer the most protection. During a side impact on only one body, these interlocks provide edge support. The side forces are shown as horizontal arrows. If a sufficient interlock is not in place, the sides will buckle inwards and the structural integrity of the case 200 will be compromised, potentially damaging the guest device 102.

Smart Power Supply—Power Subsystem

Figure 19:
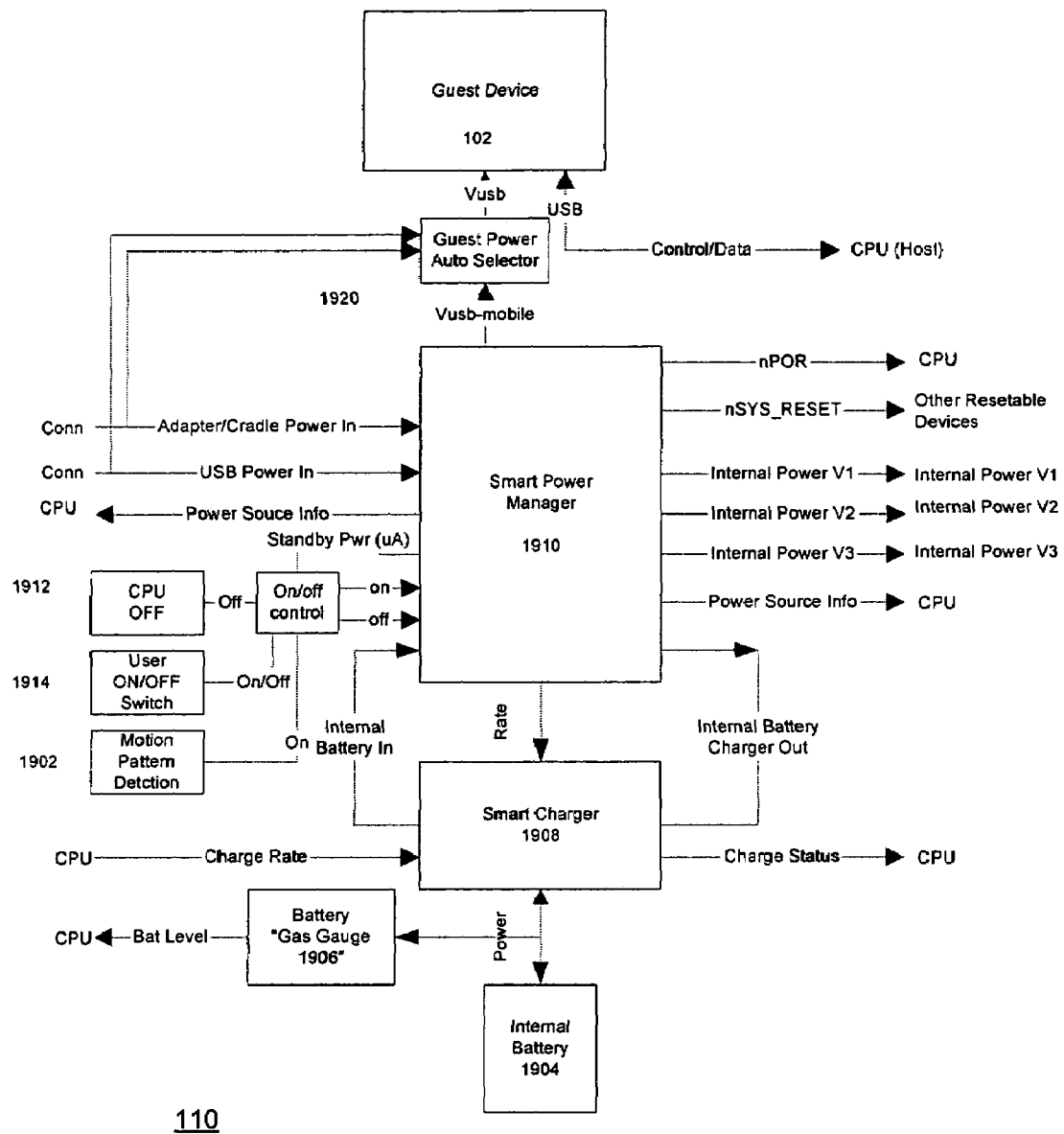
FIG. 19 is a block diagram of a power subsystem of the protective case.

Referring to FIG. 19, there is shown a block diagram of the power subsystem 110. The heart of the power subsystem is a smart power manager 1910 that provides various voltages to the host device 200 and guest device 102.

A variable rate smart charger 1908 comprises three components: (1) managed power for the guest device; (2) a variable rate charger for the host system; and (3) a charge policy manager that takes the scarce resource of charging current and performs a dynamic reallocation between the guest and host batteries 1904.

The host device 200 has a battery gas gauge 1906 that measures the inflow and out flow from battery 1094. The guest device's battery is also monitored by the guest power auto selector 1920. If the guest battery is running low, the smart charger 1908 can provide an emergency charge from its own battery 1904. If the guest battery is charged up then the charger 1908 provides the full power that the battery 1904 can absorb. If the host battery 1904 is fully charged the smart charger can provide a charge to the guest battery. If neither battery is fully charged then the smart charger 1908 can regulate the current between them.

The guest power auto selector 1920 when connected to more than one external power source and knows how much current it is permitted draw from each source. External sources include: a USB connector from a computer, for example; a mobile cradle (e.g., in a car) and an internal supply which can be boosted from an external supply. The importance of this embodiment is that it permits dynamic proportional allocation of the uses of external and internal power sources between operational requirements and the optimum recharging of both guest and device batteries given the power available.

Low Power Mode.

Referring again to FIG. 19 in this embodiment the peripherals device 200 includes an accelerometer or other device 1902 that is used to determine motion and/or lack of motion for a period of time. The movement detector is meant to monitor device movements and, more specifically, detect and determine patterns of movement and take appropriate actions based on these patterns. Patterns may consist of acceleration sequences with impulse, speed and frequency characteristics. The CPU Off device 1912 keeps the host device 200 on a low power state that turns the host device 200 back on only under certain conditions. Patterns will be classified and idle patterns detected (e.g. sitting still, background vibration such as in a car or truck, etc.) to determine when the unit is "resting." For example, the host device 200 may be in a low power state in a truck. The motion detector 1902 senses that there is much vibration but the user pattern indicates that this is normal and will not activate the host device 200. On the other hand, other motion patterns that are not normal may reactivate the device 200. In the low power state most components are powered off except a monitor that detects power-on conditions. The monitor draws only enough power to detect the conditions that trigger a turn on. A user ON/OFF block 1914 is a smart on/off device that accepts inputs that override the CPU Off switch.

When a "resting" pattern is detected for a sufficient period of time it will trigger an event which puts the unit in a much lower power consumption mode or, in certain cases actually turns the unit off. When movement patterns occur which are not of the selected "resting" patterns and such other criterion which may be applicable, an electronic trigger will signal the CPU and power supply to return the unit to full operational speed, and if enabled, cause the power supply to turn on automatically if it had been turned completely off.

A mechanism within the device allows the device 200 electronics to go into a low power mode in response to a period of inactivity. The low power mode turns off everything except the mechanism that determines when to turn the peripherals device back on. The events that trigger this low power mode can include no motion and patterns of low activity, as discussed briefly above. A wakeup signal is provided to power on the peripherals when these conditions or patterns stop existing. This wake up signal can be activated by any movement of the device, user touch, or any electronic activity such as receiving an email or transmitting one, collection of data and transmission of data. The advantages to this accelerometer are: a) much lower battery consumption; b) automatic long term storage without having to remember to turn the unit off; c) fast power up from absolute off; and, d) instant on from "low power doze" or "sleep" modes.

A guest power auto selector 1920 when the PDA is connected to an external power source, knows how much current to draw from the source. There are several sources of power for the PDA 102. These include (1) USB power from a desktop computer to which the PDA 102 is connected; (2) a cradle device (e.g., in a car); and (3) an internal supply, which can be boosted. The PDA is monitored and the peripherals device 100 provides some current temporarily to keep the PDA 102 running when its battery is low on charge.

A variable rate smart charger 1908 has three components (1) managed power for the PDA; (2) a variable rate charger for the battery of the peripherals device 100; (3) a charge policy manager that takes a scarce resource (such as charge) and performs dynamic reallocation of charging current between the battery of the PDA 102 and of the peripherals device 1904. The amount of current available for each battery is limited to the maximum draw rate for each battery The battery gas gauge 1906 measures the current flowing into and the current coming out of the internal battery 1904 so that the rate of discharge and the rate of charge can be monitored.

User Controls.

Figure 20:
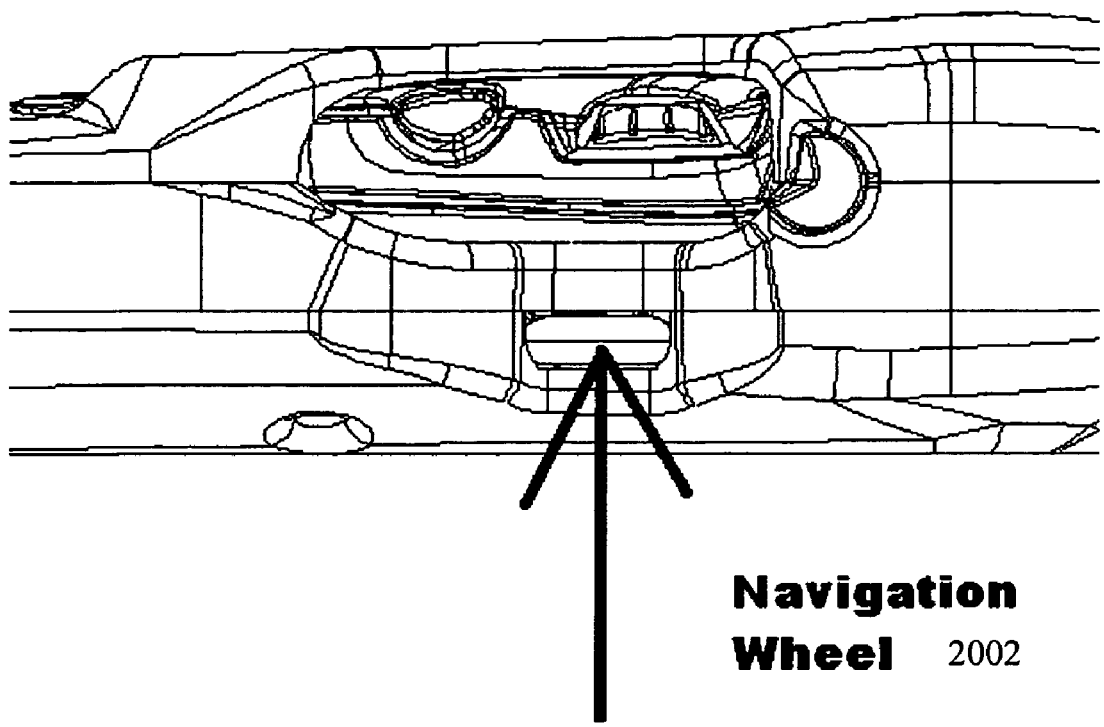
FIG. 20 shows the user controls.

Referring to FIG. 20, user application controls 2000 consist of undedicated input devices which are manipulable by the user. These devices are sensed and interpreted by their respective device managers with the sense information sent up to the guest device in the form of messages. The messages reflect the current sense information in a form which can be acted upon by the application programs running in the guest device.

The primary user application control consists of a multi-function input switch 2002 which can emit three different messages, UP, DOWN, and CLICK. One implementation of this control 2002 can be a switch with distinct up-down-click contacts. The distinct contact device 2002 senses ground on the contact closures via I/O port interrupts. These contact closures are interpreted and converted to an up-down-click event message. Another implementation is a track wheel-push-button device. In the track wheel implementation, the quadrature signals are interpreted in a similar manner to generate the UP DOWN and event messages while the pushbutton contact closure is monitored separately to generate CLICK message.

It is to be understood that the foregoing descriptions are intended to illustrate and not to limit the scope of the invention, which is defined by the scope of the appended claims. Other embodiments are within the scope of the following claims.

We claim:

1. A modular housing for a handheld communication device comprising:
   an input for receiving information;
   a processor for processing the information;
   circuitry, coupled to the processor, for providing a plurality of functions complementary to the handheld communication device;
   an interface between the processor and the handheld communication device for providing a communication link with the handheld communication device; and
   a set of case interlocks to share the forces of an impact on the housing such that during an impact the interlocks are driven together.

2. An intelligent host for a handheld communication device comprising:
   an input for receiving information;
   a system circuit board comprising a processor and associated electronics for processing the information received;
   an interface for coupling to the handheld communication device to communicate with the communication device; and
   housing comprising a conformal cavity for receiving the handheld communication device, wherein the housing comprises a plurality of parts, each with force management interlocking connectors.

3. The intelligent host of claim 2, wherein each part comprises a shape that directs impact on its surface into the interlocking connectors.

* * * * *

UNITED STATES PATENT AND TRADEMARK OFFICE
CERTIFICATE OF CORRECTION

PATENT NO. : 7,663,878 B2 Page 1 of 1
APPLICATION NO. : 11/388589
DATED : February 16, 2010
INVENTOR(S) : Swan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 801 days.

Signed and Sealed this

Thirtieth Day of November, 2010

David J. Kappos
*Director of the United States Patent and Trademark Office*